_United States Patent Office_

3,275,471
Patented Sept. 27, 1966

3,275,471
METHOD OF PREPARING AN OXIDATION RESISTANT ARTICLE
Carl E. Lowell, East Cleveland, and Roland P. Goton, Lakewood, Ohio, assignors to Union Carbide Corporation, a corporation of New York
No Drawing. Original application Oct. 12, 1959, Ser. No. 845,664. Divided and this application July 3, 1961, Ser. No. 128,620
3 Claims. (Cl. 117—169)

This application is a division of application Serial No. 845,664, filed Oct. 12, 1959, and now abandoned.

This invention relates to oxidation-resistant coatings for nuclear reactor components. It more particularly refers to a method of applying a very thin oxidation resistant coating on a nuclear reactor component which does not substantially increase the neutron absorption capacity of the component.

Graphite is generally very well suited to use at high temperatures. It has many unique properties such as high temperature strength, high thermal conductivity, resistance to thermal shock, dimensional stability, low neutron absorption, very high melting point and resistance to radiation damage. It suffers, however, from the inherent defect of being readily oxidized at these high temperatures and, therefore, workers in the high temperature arts are often denied its use because oxidation can not be tolerated in the given application. In the past several years, many methods have been devised for rendering graphite at least partially resistant to the detrimental effects of high temperature oxidation. On the whole, these methods have consisted of either impregnating or coating a graphite article with an oxidation-resistant material.

Most of these methods have been adequate for their intended use; however in nuclear reactors very stringent specifications must be met and, up to the present time, no graphite article has been made which complies fully with these specifications. For example, an article for nuclear use must have a very low neutron absorption cross-section. This effectively eliminates the impregnation method of rendering graphite articles resistant to high temperature oxidation since such technique generally adds too much foreign material to the article. A coating to be adapted to use in this field must consist of a material which uniformly wets a graphite surface, forms a flake-resistant bond with the surface, has a low neutron absorption cross-section, and provides excellent high temperature oxidation resistance to the graphite article for extended periods of time.

These requirements are fulfilled by this invention which includes a graphite nuclear reactor component having a very thin, oxidation-resistant silicon-silicon carbide coating thereon. Silicon has been particularly chosen for this application because its neutron absorption cross-section is 0.111 barns per atom which is the lowest value for any refractory material other than graphite. The neutron absorption cross-section of the coating material is of the utmost importance when a nuclear fuel element is the article being coated since it is a measure of the neutron-absorptivity of the coating material. In this application, it is imperative that the smallest possible proportion of neutrons be absorbed by the article, including the coating itself, so as to make the maximum proportion available to propagate the fission reaction.

This situation may be brought about by either of two means or by a suitable combination of these two means. Since the neutron absorptivity of the coating in question is a function of the particular coating material, it is important to select that refractory material which has the lowest neutron absorption cross section. Further, the neutron absorptivity is also a function of the number of atoms of the coating material available to trap escaping neutrons. This means that the thickness of the coating should be kept to a minimum. An additional important consideration which must be met is the fact that the coating must prevent the oxidation of the article.

Keeping these three requirements in mind, a coating of silicon having silicon carbide dispersed therethrough, of a thickness great enough to prevent oxidation of the article but thin enough to allow passage of a sufficiently large proportion of neutrons to sustain the fission reaction, may be applied in accordance with this invention. It has been determined that the coating should not be greater than about 0.005 inch thick in order to allow the passage of a sufficient proportion of neutrons to sustain the fission reaction. It has been determined that a 0.001 inch thick coating which uniformly covers the entire reactor component surface exposed to oxidizing conditions is the minimum thickness necessary. This minimum is dictated by economic factors because the thinner the coating becomes the more expensive it is to apply even though the amount of material in the coating decreases. Balancing out the economic and the physical considerations, it has been determined that the preferred coating thickness should be between 0.001 and 0.003 inch thick.

One method by which coatings of sufficient uniformity and thickness may be applied to reactor components having graphite as one of the major constituents is to form a slurry of silicon, silicon carbide, a suspension aid if necessary, and a suspending medium. The article to be protected against oxidation may be suitably dipped into the slurry or the slurry may be coated onto the article surface by a painting or other technique. In either case the article having the slurry coated thereon is properly air dried and then fired to melt and distribute the coating substantially uniformly on the surface of the article being treated. The fired article and coating are subsequently cooled, thus forming an oxidation resistant layer less than 0.005 inch thick consisting of fine-grained silicon containing silicon carbide evenly distributed therethrough. The painting technique is best adapted to use where only a portion of the article needs to be coated, whereas the dipping technique is more adapted to provide a total coating over the entire article. Total coating is accomplished by supporting the article to be coated, preferably at one end thereof, by means of a small carbon rod. After all the surface of the article, except where the carbon rod makes contact, have been duly coated and fired, the rod is ground away to expose the last uncoated surface which is then coated and fired thereby completely protecting the article.

It is preferred to fire the coated article to between 1415° C. and 1500° C. either in an inert atmosphere or under low pressure. The inert atmosphere may consist of argon or helium or any other suitable non-oxidizing atmosphere which will not react with either carbon or silicon at the firing temperature. If a vacuum is chosen, it should be a pressure of less than 0.2 mm. Hg absolute with pressures of the order of 0.01 mm. Hg absolute preferred. The vacuum technique is especialy preferred where the reactor component is a fuel element containing a reactive material interspersed therewith. For example, if the article to be coated is a nuclear fuel element of uranium monocarbide in a graphite matrix, the reactive material, uranium monocarbide, would be maintained in its desired state.

The slurry adapted to use in this invention should suitably comprise equal parts of silicon and silicon carbide in finely divided form mixed with a suspending medium about equal in weight to the total weight of the silicon-silicon carbide mixture. This slurry may be modified